US007684430B2

(12) United States Patent
Gaur et al.

(10) Patent No.: US 7,684,430 B2
(45) Date of Patent: Mar. 23, 2010

(54) FRAME-BASED AGGREGATION AND PRIORITIZED CHANNEL ACCESS FOR TRAFFIC OVER WIRELESS LOCAL AREA NETWORKS

(75) Inventors: Sudhanshu Gaur, Burlingame, CA (US); Karthik Channakeshava, Blacksburg, VA (US)

(73) Assignee: Hitachi, Ltd., Tokyo (JP)

( * ) Notice: Subject to any disclaimer, the term of this patent is extended or adjusted under 35 U.S.C. 154(b) by 680 days.

(21) Appl. No.: 11/517,522

(22) Filed: Sep. 6, 2006

(65) Prior Publication Data

US 2008/0056297 A1   Mar. 6, 2008

(51) Int. Cl.
*H04L 12/413* (2006.01)
(52) U.S. Cl. .................. 370/447; 370/338; 370/412; 370/230; 370/477
(58) Field of Classification Search .......... 370/447, 370/338, 412, 230, 477
See application file for complete search history.

(56) References Cited

U.S. PATENT DOCUMENTS

| 6,104,757 | A | 8/2000 | Rhee | |
|---|---|---|---|---|
| 6,587,985 | B1 | 7/2003 | Fukushima et al. | |
| 2003/0009764 | A1 | 1/2003 | Krishnamachari | |
| 2003/0072376 | A1 | 4/2003 | Krishnamachari et al. | |
| 2004/0027991 | A1* | 2/2004 | Jang et al. ............... | 370/230 |
| 2005/0036546 | A1 | 2/2005 | Rey et al. | |
| 2005/0147041 | A1* | 7/2005 | Zaki et al. ............... | 370/235 |
| 2005/0254447 | A1 | 11/2005 | Miller-Smith | |
| 2005/0271019 | A1* | 12/2005 | Yuan et al. .............. | 370/338 |
| 2007/0206639 | A1* | 9/2007 | Zhao et al. .............. | 370/477 |
| 2009/0067326 | A1* | 3/2009 | Perrot et al. ............ | 370/230 |

FOREIGN PATENT DOCUMENTS

WO   WO 2006/061801 A1   6/2006

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 8 Medium Access Control (MAC) Quality of Service Enhancements, specifically, see section 7.3.2.27 EDCA Parameter Set Element, pp. 47-49, and section 9.9.1 HCF contention-based channel access (EDCA), pp. 80-85, Nov. 11, 2005.

(Continued)

*Primary Examiner*—Ricky Ngo
*Assistant Examiner*—Rasheed Gidado
(74) *Attorney, Agent, or Firm*—Mattingly & Malur, P.C.

(57) ABSTRACT

A method comprises receiving by a MAC layer of a content server a transmission frame from an upper layer of the content server, the transmission frame being associated with a given access class of multiple access classes, the given access class being associated with a primary priority level, the transmission frame including content being associated with a secondary priority level; setting MAC layer parameter values based on the primary priority level, a given one of the MAC layer parameter values being based on the primary and secondary priority levels; and contending for access to a wireless medium using the MAC layer parameter values. The given one of the MAC layer parameter values may include AIFS, CWmax, CWmin, or TXOP. The method may further comprise generating the transmission frame by a hierarchically divided encryption protocol, e.g., MPEG, being resident in at least one of the upper layers of the content server.

20 Claims, 12 Drawing Sheets

OTHER PUBLICATIONS

R. Kapoor, M. Cesana and M. Gerla, "Link Layer Support For Streaming MPEG Video Over Wireless Links," International Conference On Computer Communications and Networks (ICCCN 2003), Dallas, Texas, Oct. 20-22, 2003, 6 pages.

L. Romdhani, Q. Ni and T. Turletti, "Adaptive EDCF: Enhanced Service Differentiation For IEEE 802.11 Wireless Ad Hoc Networks," IEEE Wireless Communications and Networking Conference (WCNC 2003), New Orleans, Louisiana, USA, Mar. 16-20, 2003, pp. 1373-1378.

* cited by examiner

Default EDCA AC Parameter Set

| AC | CWmin | CWmax | AIFSN | TXOP Limit (ms) |
|---|---|---|---|---|
| (1) AC_BK | 15 | 1023 | 7 | 0 |
| (0) AC_BE | 15 | 1023 | 3 | 0 |
| (2) AC_VI | 7 | 15 | 2 | 3.008 |
| (3) AC_VO | 3 | 7 | 2 | 1.504 |

FIG. 1
(PRIOR ART)

Discriminatory EDCA Parameter Set #1

| AC | CWmin | CWmax | AIFSN | TXOP Limit (ms) |
|---|---|---|---|---|
| (1) AC_BK | 15 | 1023 | 7 | 0 |
| (0) AC_BE | 15 | 1023 | 3 | 0 |
| (2) AC_VI | B-Frames: 7 I/P-Frames: 5 | B-Frames: 15 I/P-Frames: 10 | B-Frames: 2 I/P-Frames: 2 | B-Frames: 3.008 I/P-Frames: 4.500 |
| (3) AC_VO | 3 | 7 | 2 | 1.504 |

FIG. 5A

Discriminatory EDCA Parameter Set #2

| AC | AIFSN |
|---|---|
| (1) AC_BK | 7 |
| (0) AC_BE | 4 |
| (2) AC_VI | B-Frames: 3 I/P-Frames: 2 |
| (3) AC_VO | 2 |

FIG. 5B

Discriminatory EDCA Parameter Set #3

| AC | AIFSN |
|---|---|
| (1) AC_BK | 7 |
| (0) AC_BE | 3 |
| (2) AC_VI | B-Frames: 2.5 I/P-Frames: 2 |
| (3) AC_VO | 2 |

FIG. 5C

Discriminatory EDCA Parameter Set #4

| AC | CWmin | CWmax | AIFSN | TXOP Limit (ms) |
|---|---|---|---|---|
| (1) AC_BK | 15 | 1023 | 7 | 0 |
| (0) AC_BE | 15 | 1023 | 3 | 0 |
| (2) AC_VI | 7 Except B-Frames when n>=T:5 | 15 Except B-Frames when n>=T:10 | 2 Except B-Frames when n>=T:1.7 | 3.008 |
| (3) AC_VO | 3 | 7 | 2 | 1.504 |

FIG. 10

FRAME-BASED AGGREGATION AND PRIORITIZED CHANNEL ACCESS FOR TRAFFIC OVER WIRELESS LOCAL AREA NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless local area networks, and more particularly provides frame-based aggregation and prioritized channel access for traffic, e.g., video traffic, over wireless local area networks.

BACKGROUND

As users experience the convenience of wireless connectivity, they are demanding increasing support. Typical applications over wireless networks include video streaming, video conferencing, distance learning, etc. Because wireless bandwidth availability is restricted, quality of service (QoS) management is increasingly important in 802.11 networks. IEEE 802.11e proposes to define QoS mechanisms for wireless gear that gives support to bandwidth-sensitive applications such as voice and video.

The original 802.11 media access control (MAC) protocol was designed with two modes of communication for wireless stations. The first mode, Distributed Coordination Function (DCF), is based on Carrier Sense Multiple Access with Collision Avoidance (CSMA/CA), sometimes referred to as "listen before talk." A station waits for a quiet period on the network and then begins to transmit data and detect collisions. The second mode, Point Coordination Function (PCF), supports time-sensitive traffic flows. Wireless access points periodically send beacon frames to communicate network identification and management parameters specific to the wireless network. Between sending beacon frames, PCF splits the time into a contention-free period and a contention period. A station using PCF transmits data during contention-free periods.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distribution Coordination Access (EDCA) introduces the concept of traffic categories. Using EDCA, stations try to send data after detecting that the medium is idle for a set time period defined by the corresponding traffic category. A higher-priority traffic category will have a shorter wait time than a lower-priority traffic category. While no guarantees of service are provided, EDCA establishes a probabilistic priority mechanism to allocate bandwidth based on traffic categories.

The IEEE 802.11e EDCA standard provides QoS differentiation by grouping traffic into four access classes (ACs), i.e. voice, video, best effort and background. Each transmission frame from the upper layers bears a priority value (0-7), which is passed down to the MAC layer. Based on the priority value, the transmission frames are mapped into the four ACs at the MAC layer. The voice AC has the highest priority; the video AC has the second highest priority; the best effort AC has the third highest priority; and the background AC has the lowest priority. Each AC has its own transmission queue and its own set of medium access parameters. Traffic prioritization uses the medium access parameters—AIFS interval, contention window (CW, CWmin and CWmax), and transmission opportunity (TXOP)—to ensure that a higher priority AC has relatively more medium access opportunity than a lower priority AC.

Generally, the arbitration interframe space (AIFS) is the time interval that a station must sense the medium to be idle before invoking a backoff mechanism or transmission. A higher priority AC uses a smaller AIFS interval. The contention window (CW, CWmin and CWmax) indicates the number of backoff time slots until the station can attempt another transmission. The contention window is selected as a random backoff number of slots between 0 and CW. CW starts at CWmin. CW is essentially doubled every time a transmission fails until CW reaches its maximum value CWmax. Then, CW maintains this maximum value until the transmission exceeds a retry limit. A higher priority AC uses smaller CWmin and CWmax. A lower priority AC uses larger CWmin and CWmax. The Transmission Opportunity (TXOP) indicates the maximum duration that an AC can be allowed to transmit transmission frames after acquiring access to the medium. To save contention overhead, multiple transmission frames can be transmitted within one acquired TXOP without any additional contention, as long as the total transmission time does not exceed the TXOP duration.

To reduce the probability of two stations colliding, because the two stations cannot hear each other, the standard defines a virtual carrier sense mechanism. Before a station initiates a transaction, the station first transmits a short control frame called RTS (Request To Send), which includes the source address, the destination address and the duration of the upcoming transaction (i.e. the data frame and the respective ACK). Then, the destination station responds (if the medium is free) with a response control frame called CTS (Clear to Send), which includes the same duration information. All stations receiving either the RTS and/or the CTS set a virtual carrier sense indicator, i.e., the network allocation vector (NAV), for the given duration, and use the NAV together with the physical carrier sense when sensing the medium. This mechanism reduces the probability of a collision in the receiver area by a station that is "hidden" from the transmitter station to the short duration of the RTS transmission, because the station hears the CTS and "reserves" the medium as busy until the end of the transaction. The duration information in the RTS also protects the transmitter area from collisions during the ACK from stations that are out of range of the acknowledging station. Due to the fact that the RTS and CTS are short, the mechanism reduces the overhead of collisions, since these transmission frames are recognized more quickly than if the whole data transmission frame was to be transmitted (assuming the data frame is bigger than RTS). The standard allows for short data transmission frames, i.e., those shorter than an RTS Threshold, to be transmitted without the RTS/CTS transaction.

With these medium access parameters, EDCA works in the following manner:

Before a transmitting station can initiate any transmission, the transmitting station must first sense the channel idle (physically and virtually) for at least an AIFS time interval. If the channel is idle after an initial AIFS interval, then the transmitting station initiates an RTS transmission and awaits a CTS transmission from the receiving station.

If a collision occurs during the RTS transmission or if CTS is not received, then the transmitting station invokes a backoff procedure using a backoff counter to count down a random number of backoff time slots selected between 0 and CW (initially set to CWmin). The transmitting station decrements the backoff counter by one as long as the channel is sensed to be idle. If the transmitting station senses the channel to be busy at any time during the backoff procedure, the transmitting station suspends its current backoff procedure and freezes its backoff counter until the channel is sensed to be idle for an AIFS interval again. Then, if the channel is still idle, the transmitting station resumes decrementing its remaining backoff counter.

Once the backoff counter reaches zero, the transmitting station initiates an RTS transmission and awaits a CTS transmission from the receiving station. If a collision occurs during the RTS transmission or CTS is not received, then the transmitting station invokes another backoff procedure, possibly increasing the size of CW. That is, as stated above, after each unsuccessful transmission, CW is essentially doubled until it reaches CWmax. After a successful transmission, CW returns to its default value of CWmin. During the transaction, the station can initiate multiple frame transmissions without additional contention as long as the total transmission time does not exceed the TXOP duration.

The level of QoS control for each AC is determined by the combination of the medium access parameters and the number of competing stations in the network.

The default EDCA parameter values used by non-AP QoS stations (QSTAs) are identified in FIG. 1. A TXOP_Limit value of 0 indicates that a single MAC service data unit (MSDU) or MAC protocol data unit (MPDU), in addition to a possible RTS/CTS exchange or CTS to itself, may be transmitted at any rate for each TXOP.

Systems and methods are needed that can further discriminate between transmission frames within a single AC. Example prior art references include the following:

frame information within the video AC. By identifying MPEG frame types at the MAC layer, the system and method can enable transmission-frame aggregation and prioritized channel access for different priority MPEG frames. Inter-video-frame differentiation may lead to fewer collisions for high priority transmission frames. Transmission-frame aggregation may reduce latency. Reduced contention for higher priority video frame fragments may lead to improved video quality due to reduced delay and jitter. Embodiments of the present invention may be used in multimedia transmission over wireless networks including wireless local area networks and mesh networks.

According to another embodiment, the present invention provides a method comprising receiving by a MAC layer of a content server a transmission frame from an upper layer of the content server, the transmission frame being associated with a given access class of multiple access classes, the given access class being associated with a primary priority level, the transmission frame including content being associated with a secondary priority level; setting MAC layer parameter values based on the primary priority level, a given one of the MAC layer parameter values being based on the primary and secondary priority levels; and contending for access to a wireless medium using the MAC layer parameter values.

The given one of the MAC layer parameter values may be one of a first parameter value relating to arbitration interframe space, a second parameter value relating to a maximum value of a contention window, a third parameter value relating to a minimum value of the contention window, and a fourth parameter value relating to a transmission opportunity. The transmission frame from the upper layer may include a video AC frame having one of an intra-coded frame (I frame) fragment, a prediction coded frame (P frame) fragment, and a bi-directional frame (B frame) fragment. The MAC layer may transfer the transmission frame to the wireless medium with higher priority if the transmission frame includes the I frame fragment or the P frame fragment than if the transmission frame includes the B frame fragment; and the MAC layer may

---

1) IEEE Standard for Information technology - Telecommunications and information exchange between systems - Local and metropolitan area networks - Specific requirements; Part 11: Wireless LAN Medium Access Control (MAC) and Physical Layer (PHY) Specifications, Amendment 8 Medium Access Control (MAC) Quality of Service Enhancements, specifically, see section 7.3.2.27 EDCA Parameter Set Element, pages 47-49, and section 9.9.1 HCF contention-based channel access (EDCA), pages: 80-85, Nov. 11, 2005.
2) R. Kapoor, M. Cesana, M. Gerla, "Link Layer Support for Streaming MPEG Video over Wireless Links," International Conference on Computer Communications and Networks (ICCCN'03), Dallas, Texas, Oct. 20-22, 2003.
3) Lamia Romdhani, Qiang Ni, and Thierry Turletti, "Adaptive EDCF: Enhanced Service Differentiation for IEEE 802.11 Wireless Ad Hoc Networks," IEEE Wireless Communications and Networking Conference (WCNC'03), New Orleans, Louisiana, USA, Mar. 16-20, 2003.

| | | |
|---|---|---|
| 4) U.S. Pat. No. 6,104,757 | Rhee | Aug. 15, 2000 |
| 5) U.S. Pat. No. 6,587,985 B1 | Fukushima, et al. | Jul. 01, 2003 |
| 6) USPA 2003/0009764 A1 | Krishnamachari | Jan. 09, 2003 |
| 7) USPA 2003/0072376 A1 | Krishnamachari, et al. | Apr. 17, 2003 |
| 8) USPA 2004/0027991 A1 | Jang, et al. | Feb. 12, 2004 |
| 9) USPA 2005/0036546 A1 | Rey, et al. | Feb. 17, 2005 |
| 10) USPA 2005/0254447 A1 | Miller-Smith | Nov. 17, 2005 |
| 11) WO 2006/061801 A1 | Chen, et al | Jun. 15, 2006 |

SUMMARY

In one embodiment, a system and method for transmission-frame aggregation and prioritized channel access, in the context of IEEE 802.11e EDCA mechanism, exploits video arbitrate the transmission of the I, P and B frame fragments using one or more categories of the MAC layer parameter values; and the categories of the MAC layer parameter values may include a first parameter value relating to arbitration interframe space, a second parameter value relating to a maximum value of a contention window, a third parameter value relating to a minimum value of the contention window, and a fourth parameter value relating to a transmission opportunity. The method may further comprise determining whether the transmission frame includes an intra-coded frame (I frame) fragment, a prediction coded frame (P frame) fragment, or a bi-directional frame (B frame) fragment; if the transmission frame is determined to include the I frame fragment or the P frame fragment, then setting the given one of the MAC layer parameter values as a higher access priority value; and if the transmission frame is determined to include the B frame fragment, then setting the given one of the MAC layer parameter values as a lower access priority value that is lower than said higher access priority value. The method may further comprise generating the transmission frame by a hierarchically divided encryption protocol being resident in at least one of the upper layers of the content server. The hierarchically divided encryption protocol may include MPEG. The given one of the MAC layer parameter values may be different based on whether the content includes an intra-coded frame (I frame) fragment or a bi-directional frame (B frame) fragment. The given one of the MAC layer parameter values may be the same whether the content includes an I frame fragment or a prediction coded frame (P frame) fragment. The method may further comprise counting a number of transmission frames containing video AC frame fragments of a particular video frame and pending in a transmission queue, and the given one of the MAC layer parameter values may also be based on the number of transmission frames. The method may further comprise receiving a subsequent transmission frame; and sending the transmission frame and the subsequent transmission frame during a single TXOP only if the subsequent transmission frame does not include a fragment of a lower priority video frame. The method may further comprise determining whether the transmission frame includes an intra-coded frame (I frame) fragment, a prediction coded frame (P frame) fragment, or a bi-directional frame (B frame) fragment; if the transmission frame is determined to include the I frame fragment or the P frame fragment, then setting the given one of the MAC layer parameter values as a higher access priority value; counting a number of B frame fragments waiting to be transmitted; if the transmission frame is determined to include the B frame fragment and the number of the B frame fragments waiting to be transmitted is greater than a threshold, then setting the given one of the MAC layer parameter values as a higher access priority value; and if the transmission frame is determined to include the B frame fragment and the number of the B frame fragments waiting to be transmitted is not greater than the threshold, then setting the given one of the MAC layer parameter values as a lower access priority value that is lower than the higher access priority value.

According to yet another embodiment, the present invention provides a system, comprising a MAC layer, the MAC layer including a first queue for storing first transmission frames of a first primary priority level, the first transmission frames including content being associated with a secondary priority level; a second queue for storing second transmission frames of a second primary priority level; memory for storing first MAC layer parameter values based on the first primary priority level and second MAC layer parameter values based on the second primary priority level, a given one of the first MAC layer parameter values being based on the first primary priority level and on the secondary priority level; and a controller module coupled to the first and second queues and to the memory for contending for access to a wireless medium using the first and second MAC layer parameter values.

The given one of the first MAC layer parameter values may be one of a first parameter value relating to arbitration interframe space, a second parameter value relating to a maximum value of a contention window, a third parameter value relating to a minimum value of the contention window, and a fourth parameter value relating to a transmission opportunity. The particular first transmission frame may arrive from an upper layer of a content server; the particular first transmission frame may be a video AC frame having one of an intra-coded frame (I frame) fragment, a prediction coded frame (P frame) fragment, and a bi-directional frame (B frame) fragment; and the MAC layer may transfer the particular first transmission frame to the wireless medium with higher priority if the particular first transmission frame has the I frame fragment or the P frame fragment than if the particular first transmission frame has the B frame fragment. The MAC layer ma arbitrate the transmission of the I, P and B frame fragments using one or more categories of the MAC layer parameter values; and the categories of the first MAC layer parameter values may include a first parameter value relating to arbitration interframe space, a second parameter value relating to a maximum value of a contention window, a third parameter value relating to a minimum value of the contention window, and a fourth parameter value relating to a transmission opportunity. The method may further comprise a hierarchically divided encryption module resident in at least one of the upper layers of the content server for generating at least a portion of the first transmission frames. The hierarchically divided encryption protocol may include an MPEG engine. The first transmission frames of the first primary priority level may include video AC frames; the second transmission frames of the second primary priority level may include one of voice AC frames, best effort AC frames and background AC frames; the content being associated with the secondary priority level may include one of a prediction coded frame (P frame) fragment, an intra-coded frame (I frame) fragment, and a bi-directional frame (B frame) fragment; and the given one of the MAC layer parameter values may be different based on whether the content includes an I frame fragment or a B frame fragment.

According to still another embodiment, the present invention provides a system, comprising first MAC layer means for receiving a transmission frame from an upper layer of a content server, the transmission frame associated with a given access class of multiple access classes, the given access class being associated with a primary priority level, the transmission frame including content being associated with a secondary priority level; second MAC layer means for setting MAC layer parameter values based on the primary priority level, a given one of the MAC layer parameter values being based on the primary and secondary priority levels; and third MAC layer means for contending for access to a wireless medium using the MAC layer parameter values.

BRIEF DESCRIPTION OF THE DRAWINGS

FIG. 5A is a table illustrating a first EDCA parameter set for a video WLAN system server incorporating video-frame-based discrimination, in accordance with an embodiment of the present invention.

FIG. 5B is a table illustrating a second EDCA parameter set for a video WLAN system server incorporating video-frame-based discrimination, in accordance with an embodiment of the present invention.

FIG. 5C is a table illustrating a third EDCA parameter set for a video WLAN system server incorporating video-frame-based discrimination, in accordance with an embodiment of the present invention.

FIG. 10 is a table illustrating a fourth EDCA parameter set for a video WLAN system server incorporating video-frame-based discrimination with priority inheritance, in accordance with an embodiment of the present invention.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

As a matter of clarity, since the MPEG standard refers to I, P and B frames as "frames" and since IEEE 802.11e refers to data packets transmitted over the wireless medium as "frames," the specification herein attempts to differentiate the terminology by referring to "video frames" (e.g., MPEG's frames) and "transmission frames" (IEEE 802.11e frames). For further clarity, the specification attempts to refer to transmission frames placed into the video queue of the MAC layer as "video transmission frames" to differentiate them from video frames. Also, since a single MPEG video frame of a single type (e.g., an I frame) is divided into a plurality of transmission frames, each transmission frame is referred to as including a "video frame fragment" of the particular type, e.g., an "I frame fragment."

In one embodiment, a system and method for transmission-frame aggregation and prioritized channel access, in the context of IEEE 802.11e EDCA mechanism, exploits video frame information within the video AC. By identifying MPEG frame types at the MAC layer, the system and method can enable transmission-frame aggregation and prioritized channel access for different priority MPEG frames. Inter-video-frame differentiation may lead to fewer collisions for high priority transmission frames. Transmission frame aggregation may reduce latency. Reduced contention for higher priority video frame fragments may lead to improved video quality due to reduced delay and jitter. Embodiments of the present invention may be used in multimedia transmission over wireless networks including wireless local area networks and mesh networks.

Figure 12:
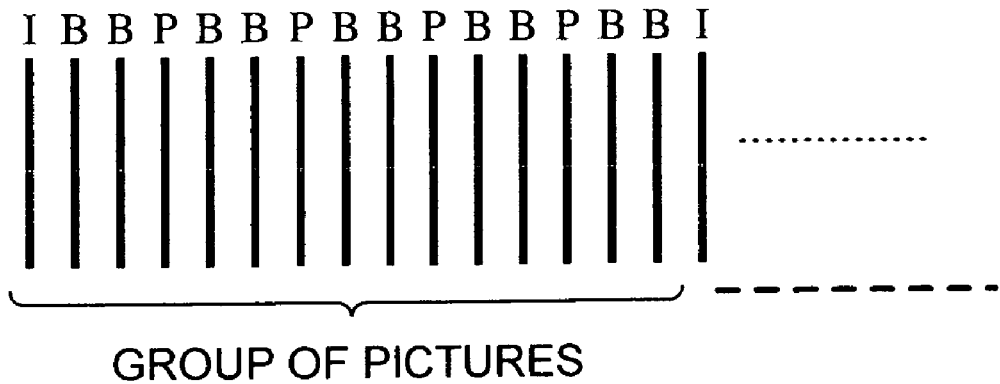
FIG. 12 illustrates a group of pictures (GOP) for an MPEG sequence, in accordance with the prior art.
Figure 13:
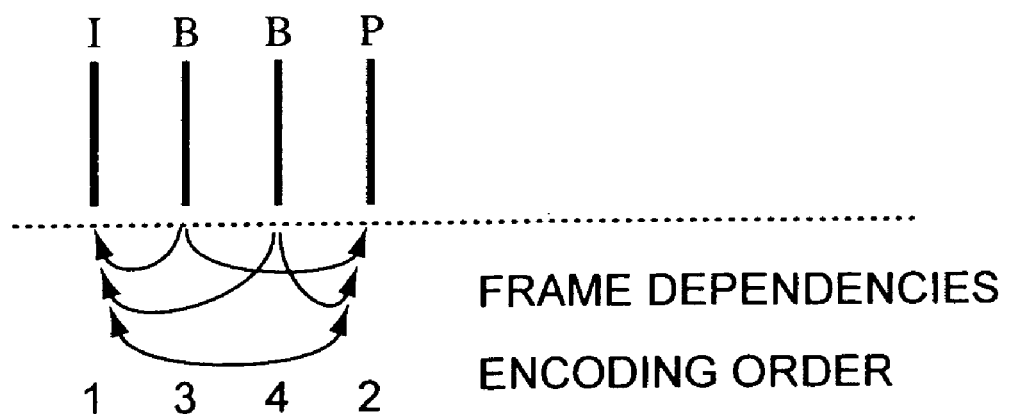
FIG. 13 illustrates a frame dependencies and encoding order for I, P and B frame types, in accordance with the prior art.

As background, various video compression techniques like H.261, H.262, H.263 or H.264 have layered architecture involving transmission of a collection of pictures called a Group of Pictures (GOP). Each GOP consists of different kinds of video frames with varying level of information content. For example, MPEG-2 uses I (intra-coded), P (prediction coded) and B (bi-directional coded) video frames as shown in FIG. 12. Among these video frames, an I frame is the actual picture, whereas a P frame and a B frame carry temporal difference information. A P frame depends on the previous I or P frame within in the GOP. A B frames depends on the previous I or P frame and the next I or P frame within the GOP. The dependency of various video frames is shown in FIG. 13. The importance of these video frames in terms of their contribution to the overall video quality is in the order of I, P then B. A loss or delay in a B frame has less impact on the video quality as compared to a loss or delay in an I frame or a P frame.

As stated above, the IEEE 802.11e standard provides QoS differentiation by grouping traffic into access categories (ACs) with different priorities. However, the EDCA channel access mechanism does not differentiate between video frames. That is, in a conventional IEEE 802.11e network, I, P and B frames are treated equally. This means that a station trying to send an I frame has same chance of gaining channel access as another station trying to send a B frame. Given that I and P frames contribute more to video quality, some systems and methods of the present invention raise the priority of I and P frames over B frames, and some raise the priority of I and P frames equally over B frames (although embodiments which prioritize I and P frames differently is also possible).

Figure 2:
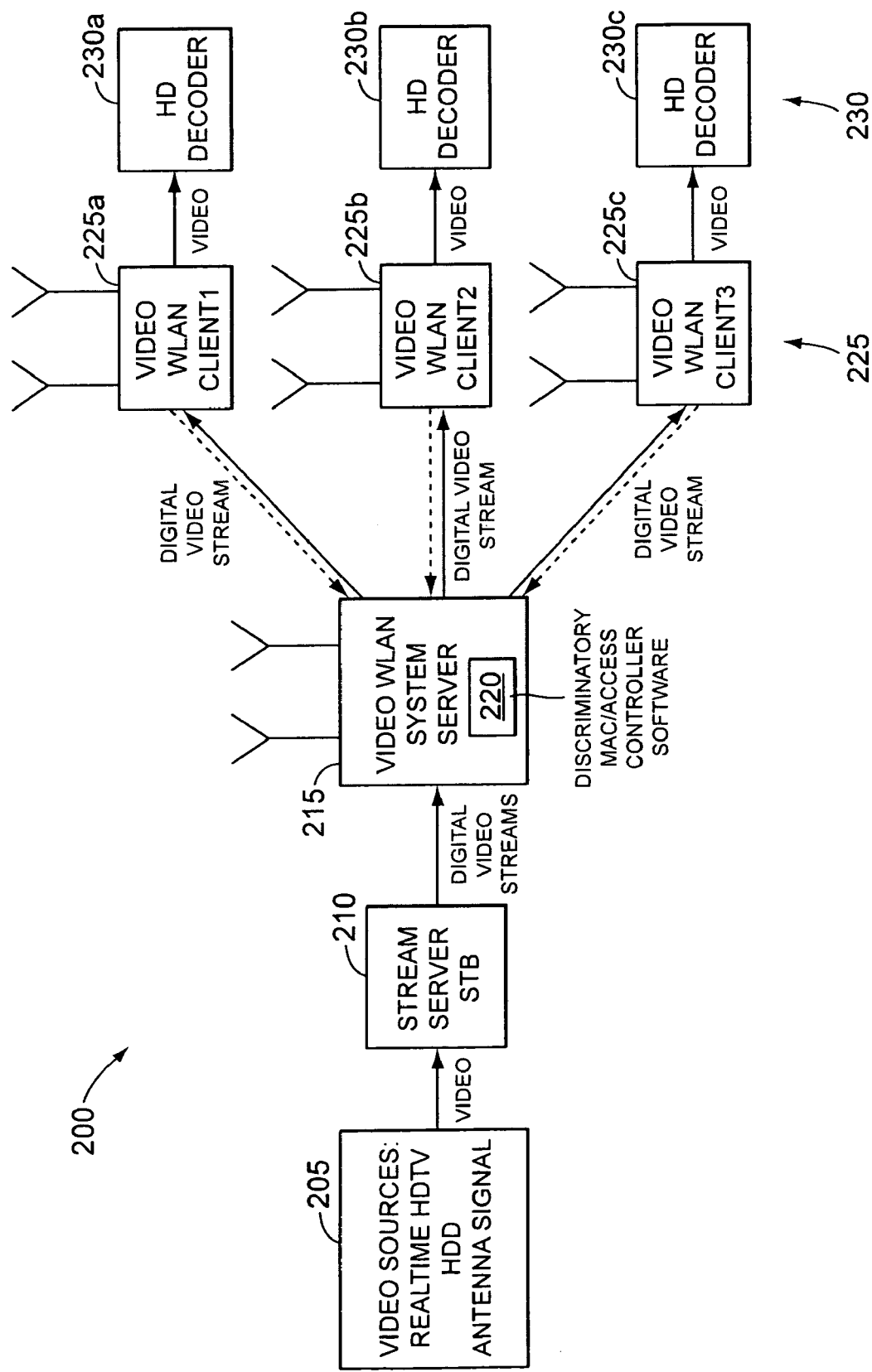
FIG. 2 is a block diagram illustrating details of a network incorporating discriminatory MAC/Access Controller Software, in accordance with an embodiment of the present invention.

FIG. 2 is a block diagram illustrating details of a network 200 incorporating a discriminatory MAC/Access Controller Software 220, in accordance with an embodiment of the present invention. Network 200 includes video sources (e.g., real-time High Definition Television (HDTV) sources, hard disk drives, video transmission antennae, etc.) 205 coupled to a stream server set top box (STB) 210, which in turn is coupled to a video WLAN system server 215 that includes the discriminatory MAC/Access Controller Software 220. The video WLAN system server 215 is coupled to various video WLAN clients 225, namely, video WLAN client 225a, video WLAN client 225b and video WLAN client 225c. Each video WLAN client 225 is coupled to an HD decoder 230, namely, video WLAN client 225a is coupled to HD decoder 230a, video WLAN client 225b is coupled to HD decoder 230b, and video WLAN client 225c is coupled to HD decoder 230c.

Generally, video sources 205 send video signals to stream server set top box (STB) 210, which digitizes the analog video signals and forwards the digital video streams to the video WLAN system server 215. Video WLAN system server 215 uses discriminatory MAC/Access Controller Software 220 to aggregate and prioritize transmission frames over the wireless medium to the video WLAN clients 225 using point-to-multiple transmission. The video WLAN clients 225 receive the transmission frames and generate video streams for the HD decoders 230 to convert to a playback signal (e.g., an HDTV signal) for presentation on video displays (e.g., television sets).

Typical application scenarios include in-flight multimedia entertainment systems (e.g., several multimedia servers serving several video clients over wireless LAN), wireless gaming (e.g., several players connected to a multimedia server over wireless LAN), and home video systems (e.g., a multimedia server serving several wireless HD TVs over wireless LAN). Other applications also exist.

Figure 3:
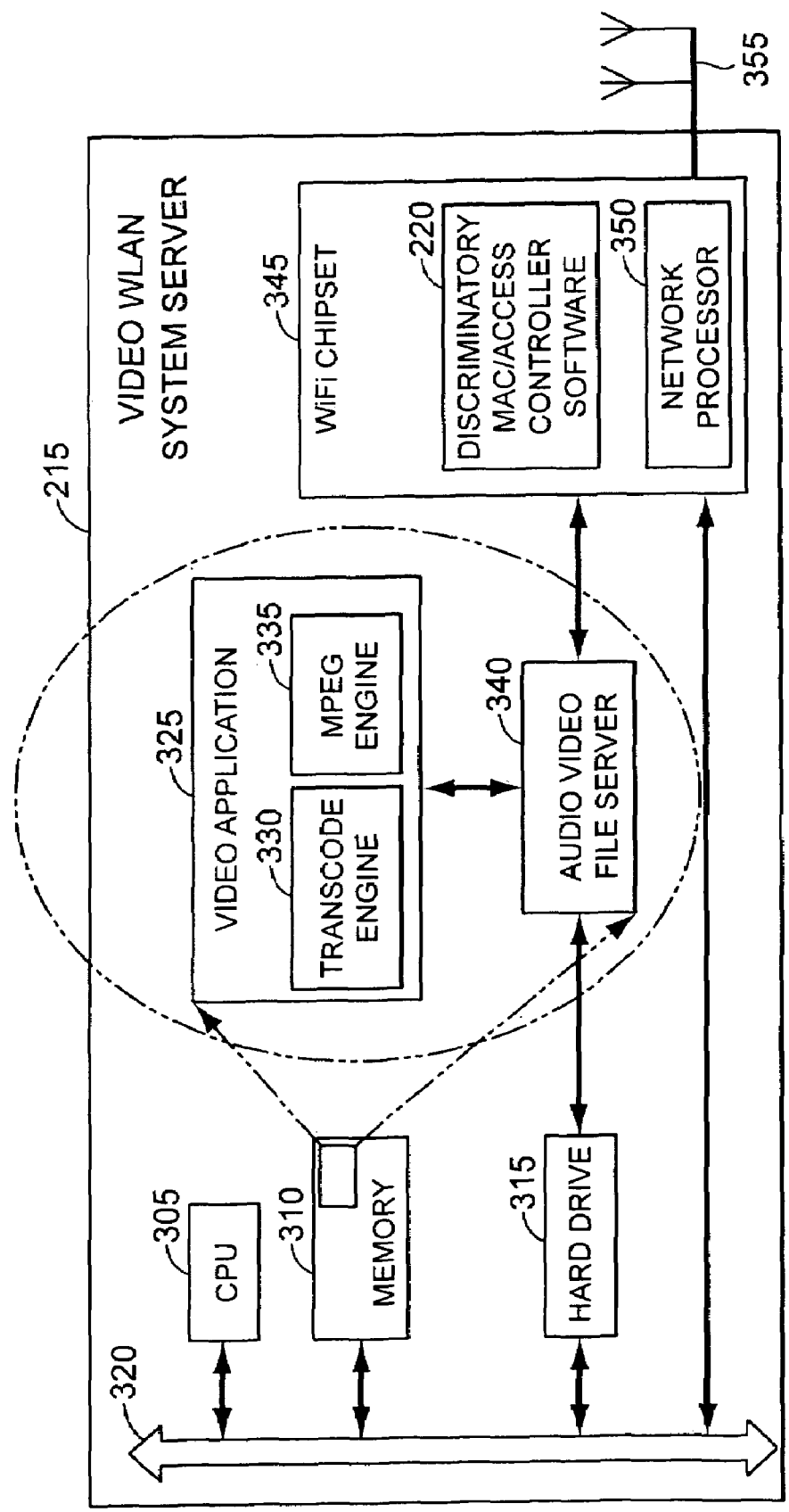
FIG. 3 is a block diagram illustrating details of a Video WLAN system server incorporating the discriminatory MAC/Access Controller Software, in accordance with an embodiment of the present invention.

FIG. 3 is a block diagram illustrating details of the Video WLAN system server 215 incorporating the discriminatory MAC/Access Controller Software 220, in accordance with an embodiment of the present invention. Video WLAN system server 215 includes a CPU 305 (such as an Intel Pentium® microprocessor or a Motorola Power PC® microprocessor), memory 310 (e.g., RAM, ROM, virtual memory, etc.), a data storage device (e.g., hard drive) 315 and a WiFi Chipset 345 (e.g., PCI card), each coupled to a communication channel 320. Although the hard drive 315 and memory 310 are illustrated as different units, they can be parts of the same unit, distributed units, virtual memory, etc. The term "memory" herein is intended to cover all storage media whether permanent or temporary. The hard drive 315 and/or memory 310 may store an operating system such as the Microsoft Windows XP, Linux, the IBM OS/2 operating system, the MAC OS, or UNIX operating system and/or other programs.

Specifically, the memory 310 stores a video application 325 having a transcode engine 330 and an MPEG engine 335 and stores an audio/video file server 340. The MPEG engine 335 enables video data compression according to MPEG specifications. The transcode engine 330 enables transcoding (format, resolution, etc.) for a diversity of receiving devices (e.g., mobile devices, PDAs, PCs, iPods, etc.). The WiFi chipset 345 includes the discriminatory MAC/access-controller software 220 and a network processor 350 (e.g., the physical layer) coupled to a wireless antenna 355.

Generally, the video application 325 interacts with the audio/video file server 340, which accesses a video file stored on the hard drive 725 and interacts with the WiFi chipset 750. The MPEG engine 335 encapsulates MPEG frames, e.g., in multiple Real-time Transport Protocol (RTP) frames, which are forwarded to the discriminatory MAC/Access Controller Software 220, which assigns the RTP frames to appropriate queues (see FIG. 4) using a discriminatory process, possibly based on the IEEE 802.11e EDCA process. The discriminatory MAC/Access Controller Software 220 performs video-frame-based prioritization to determine winning transmission frames, and passes the winning transmission frames to the network processor 350 for transmission.

Figure 4:
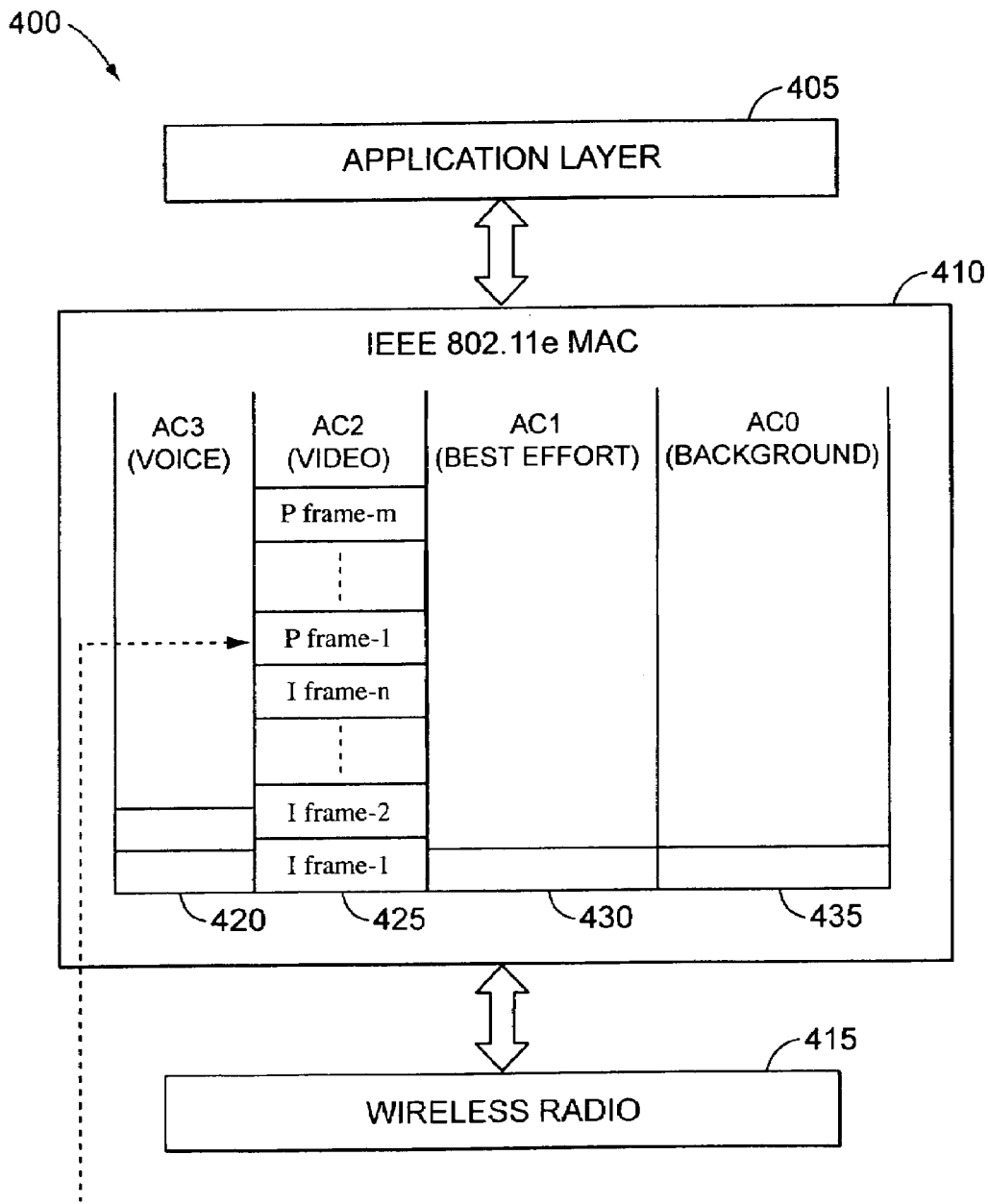
FIG. 4 is a block diagram illustrating layers in a video WLAN system server incorporating video-frame-based discrimination in an IEEE 802.11e network, in accordance with an embodiment of the present invention.
Figure 6:
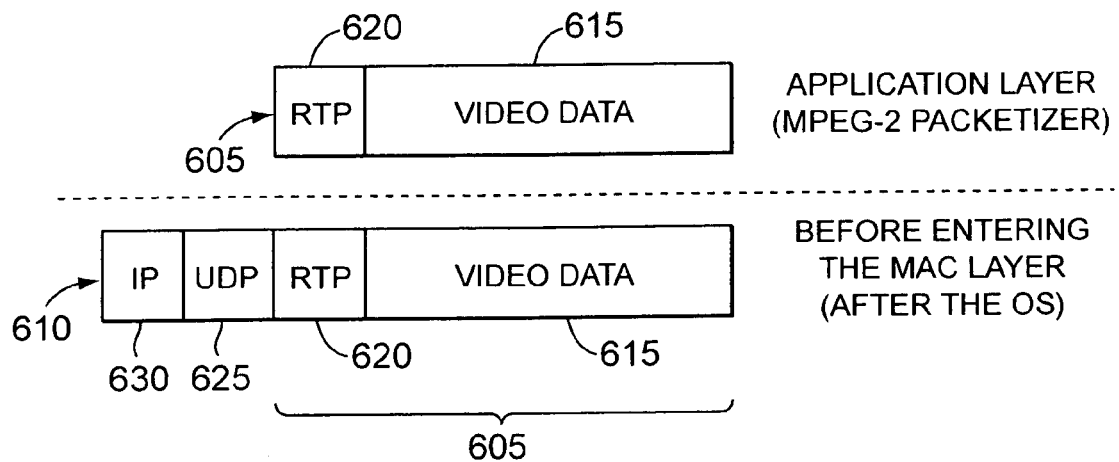
FIG. 6 is a block diagram illustrating a video frame and video frame header at the application layer and at the MAC layer, in accordance with the prior art.
Figure 7:
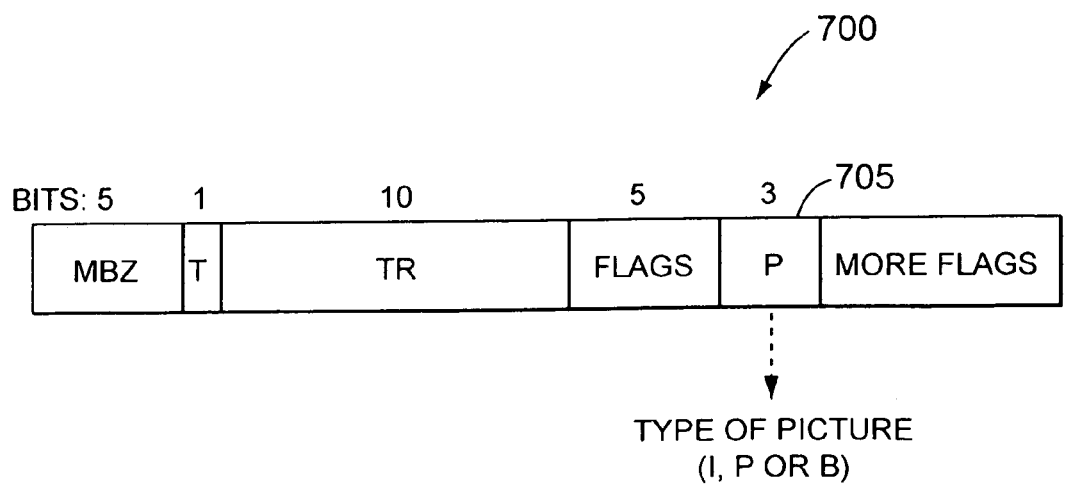
FIG. 7 is a block diagram illustrating details of the video frame header at the MAC layer, in accordance with the prior art.

FIG. 4 is a block diagram illustrating layers 400 in a video WLAN system server 215 incorporating video-frame-based discrimination, in accordance with an embodiment of the present invention. Layers 400 include an upper layer (any layer above the MAC layer 410), e.g., an application layer 405 as shown, coupled to a discriminatory MAC layer 410, which in turn is coupled to a physical layer (e.g., wireless radio) 415. In this embodiment, the application layer 405 includes the MPEG engine 335, which generates and forwards RTP frames to the MAC layer 410. FIG. 6 illustrates an example RTP frame 605 as generated by a prior art MPEG-2 engine in the application layer 405. The RTP frame includes video data 615 and an RTP header 620. As the RTP frame 605 flows down the layers 400 to the MAC layer 410, additional header information is appended to the RTP frame 605, thereby generating an Internet Protocol (IP) frame 610. FIG. 6 illustrates an IP frame 610 having a User Data Protocol (UDP) header 625 and an IP header 630 appended to the RTP frame 605. FIG. 7 illustrates details of the header 700 of the IP frame 610. As shown, header 700 includes a 3-bit flag indicating the video frame type, in this example as a P-type (Picture type) frame fragment. Other components of the header 700 include 5 MBZ (Must Be Zero) bits, 1 bit specifying MPEG type T (MPEG-2), 10 TR (Temporal Reference) bits, 5 flags bits, and other flags.

In this embodiment, upon receiving IP frames 610, the discriminatory MAC layer 410 forwards the incoming transmission frames to their respective queues per 802.11e rules. Incoming voice transmission frames are sent to the voice queue 420, incoming video transmission frames are sent to the video queue 425, incoming best effort transmission frames are sent to the best effort queue 430, and incoming background transmission frames are sent to the background queue 435. Within the queue, in this embodiment, the discriminatory MAC/Access Controller Software 220 does not reorder the transmission frames. As shown, I frame-1 to I frame-n and P frame-1 to P frame-m are maintained in the same order as they arrived.

The transmission frames contend for access to the wireless medium generally using 802.11e procedures, i.e., using EDCA parameters including AIFS, CW, CWmin, CWmax and TXOP. However, in this embodiment, the EDCA parameter values selected for each transmission frame within the video access queue is not based only on its AC. The selected EDCA parameter values are also based on video frame type. The discriminatory MAC/Access Controller Software 220 reviews the video frame type as identified in the header 700, and conducts access contention and/or access duration by setting the EDCA parameters values dynamically based on the video frame type.

Since I and P frames are deemed more important than B frames, EDCA parameter values for I and P frames may be selected to increase wireless channel access probability and/or wireless channel access duration relative to B frames. In one embodiment, the EDCA parameter values for B frames remain at the default values, and the EDCA parameter values for I and P frames are modified to increase access probability and access duration (possibly bounded by the EDCA parameter values for voice transmission frames).

An example set of EDCA parameter values for this embodiment is illustrated in FIG. 5A. As shown, the I and P frame value for CWmin has been lowered from 7 to 5; the I and P frame value for CWmax has been lowered from 15 to 10; the I and P frame value for AIFSN (AIFS Number) remains at 2; and the I and P frame value for TXOP has been raised from 3.008 to 4.500.

FIG. 5B shows another example of modifying AIFSN portion in FIG. 5A. $AIFSN_L$ (=2) for higher priority video traffic (I/P frames) and an $AIFSN_H$ (=3) for lower priority video traffic (B frame) are respectively assigned. Here, AIFSN of best effort (AC_BE) is changed to 4 from a default value of 3. Modification of EDCA parameters is not limited only for a focusing class (now video (AC_VI)) but for EDCA parameters of other classes to coordinate video frames and other transmission frames, totally.

FIG. 5C shows a second example of modifying AIFSN portion in FIG. 5A by using a random AIFSN concept. Although the AIFSN is an integer number, the $AIFSN_H$ can randomly be set to 2 or 3 under the random AIFSN technique. This leads to an average number of $AIFSN_H=2.5$, as shown in FIG. 5C. Here, the AIFSN of best effort (AC_BE) is set to the default value of 3.

FIGS. 5A-5C show examples of modifying multiple categories of EDCA parameters (CWmin, CWmax, AIFSN, TXOP) as also described later in FIG. 8. However, the arbitration (prioritization) of the video frames can be attained by modifying at least one category of EDCA parameters.

In another embodiment, EDCA parameter values for I and P frames remain at default, and the EDCA parameter values for B frames are modified to reduce wireless medium access probability and/or access duration (possibly bounded by the EDCA parameter values for best effort transmission frames).

Figure 8:
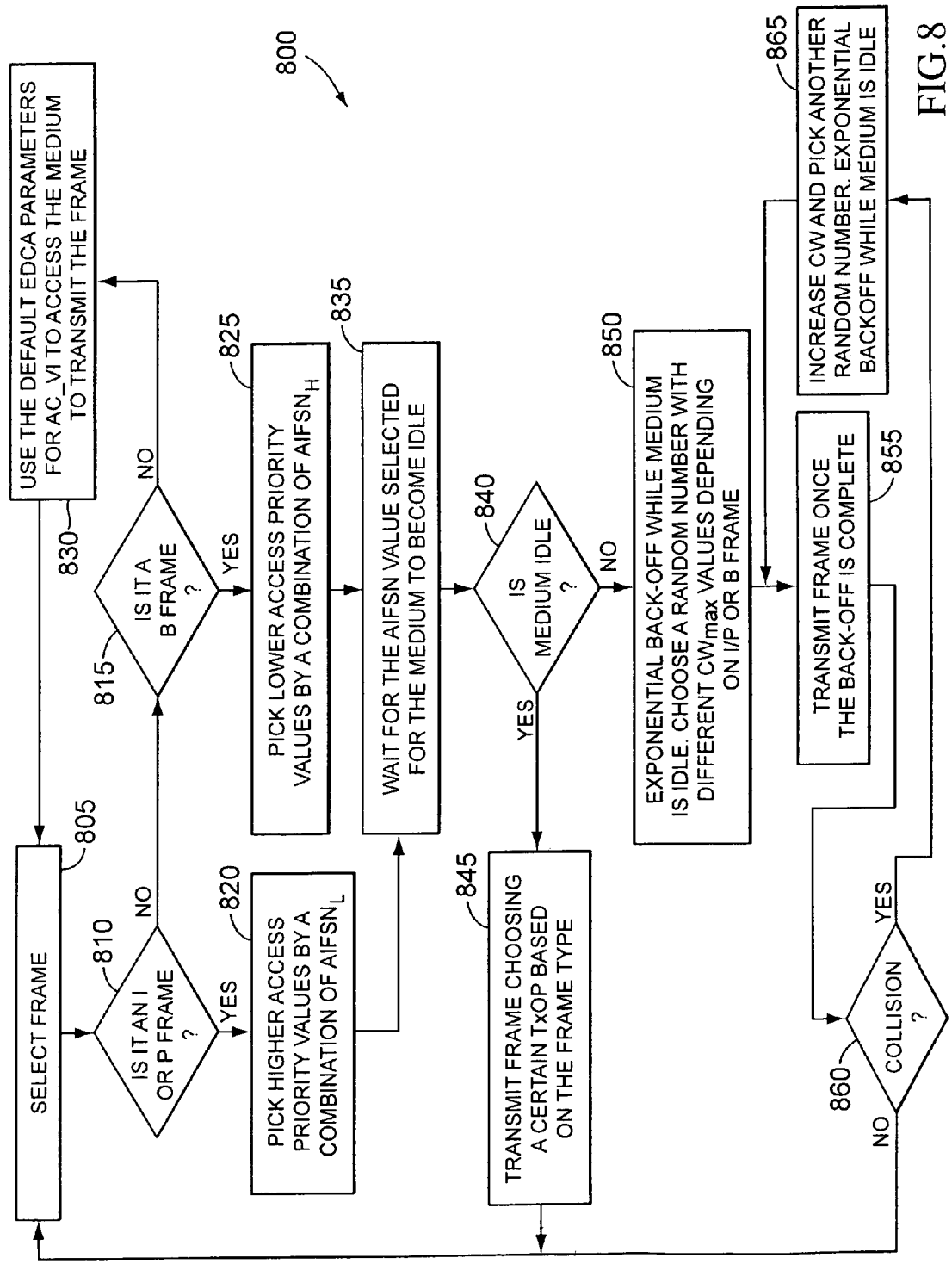
FIG. 8 is a flowchart illustrating a method of transmitting transmission frames in an IEEE 802.11e network incorporating video-frame-based discrimination, in accordance with an embodiment of the present invention.

FIG. 8 is a flowchart illustrating a method 800 of transmitting transmission frames in an IEEE 802.11e network incorporating video-frame-based discrimination, in accordance with an embodiment of the present invention. One example structure for performing method 800 is the discriminatory MAC/Access Controller Software 220 in the discriminatory MAC layer 410. Method 800 begins in step 805 by selecting a video transmission frame for transmission. The discriminatory MAC/Access Controller Software 220 in step 810 determines whether the video transmission frame includes an I/P frame fragment. If so, then the discriminatory MAC/Access Controller Software 220 in step 820 sets the EDCA parameters to values of higher priority than for B frames, possibly by using $AIFSN_L$, and proceeds to step 835. If the video transmission frame is found not to include an I/P frame fragment, then the discriminatory MAC/Access Controller Software 220 in step 825 determines if the video transmission frame includes a B frame fragment. If the video transmission frame includes a B frame fragment, then the discriminatory MAC/Access Controller Software 220 in step 825 sets the EDCA parameters to values of lower priority than for I/P frames, possibly by using $AIFSN_H$, and proceeds to step 835. If the video transmission frame does not include a B frame fragment, then the discriminatory MAC/Access Controller Software 220 determines that the video transmission frame includes a default type (e.g., uncompressed video traffic, etc.) and in step 830 uses default EDCA parameter values to contend for access to the wireless channel on behalf of the transmission frame, returning to step 805 to select another frame. The default EDCA parameter values may be identical to the EDCA parameter values of higher priority and/or lower priority video traffic. Another embodiment may not check whether the transmission frame includes a B frame fragment, and may just set all other transmission frames (including those with B frame fragments) to the lower priority values. Other alternatives also exist.

In step 835, the discriminatory MAC/Access Controller Software 220 waits for the wireless channel to be idle for the AIFS duration (which may be based on the video frame type). If the discriminatory MAC/Access Controller Software 220 in step 840 determines that the medium is idle after the AIFS duration, then the discriminatory MAC/Access Controller Software 220 in step 845 transmits the video transmission frame, using the TXOP, which is based on the AC and is possibly based on video frame type within the AC. In one embodiment, the discriminatory MAC/Access Controller Software 220 may also stop transmitting video transmission frames before the end of the TXOP duration when a transition between video frame types occurs, and possibly only when a transition from an I/P frame to a B frame occurs. That is, in one embodiment, if B frame fragments follow I/P frame fragments during a single TXOP, then the discriminatory MAC/Access Controller Software 220 may transmit only the I/P frame fragments up to the last I/P frame fragment and may hold back transmission of the B frame fragments in the same TXOP.

If the medium is not IDLE (e.g., a collision occurs), then the discriminatory MAC/Access Controller Software 220 in step 850 enters into an exponential back-off mechanism, where it picks a random number in between 0 and CW, where CW ranges between CWmin and CWmax. In one embodiment, the discriminatory MAC/Access Controller Software 220 selects the values for CWmin and CWmax based on whether the video transmission frame includes I/P frame fragment or a B frame fragment. The CW value is incremented using the binary exponential backoff mechanism as in IEEE 802.11e. When the back-off counter reaches zero, the discriminatory MAC/Access Controller Software 220 in step 855 attempts to send the video transmission frame following the same set of rules as in step 845. The discriminatory MAC/Access Controller Software 220 in step 860 determines if a collision or error occurred. If not, then the method 800 returns to step 805. If a collision or error occurred, then the discriminatory MAC/Access Controller Software 220 in step 865 increases CW to a higher value (up to CWmax), picks a random number in between 0 and CW, begins decrementing the back-off timer, and returns to step 865 to attempt to transmit the video transmission frame when the counter reaches zero again.

Figure 9:
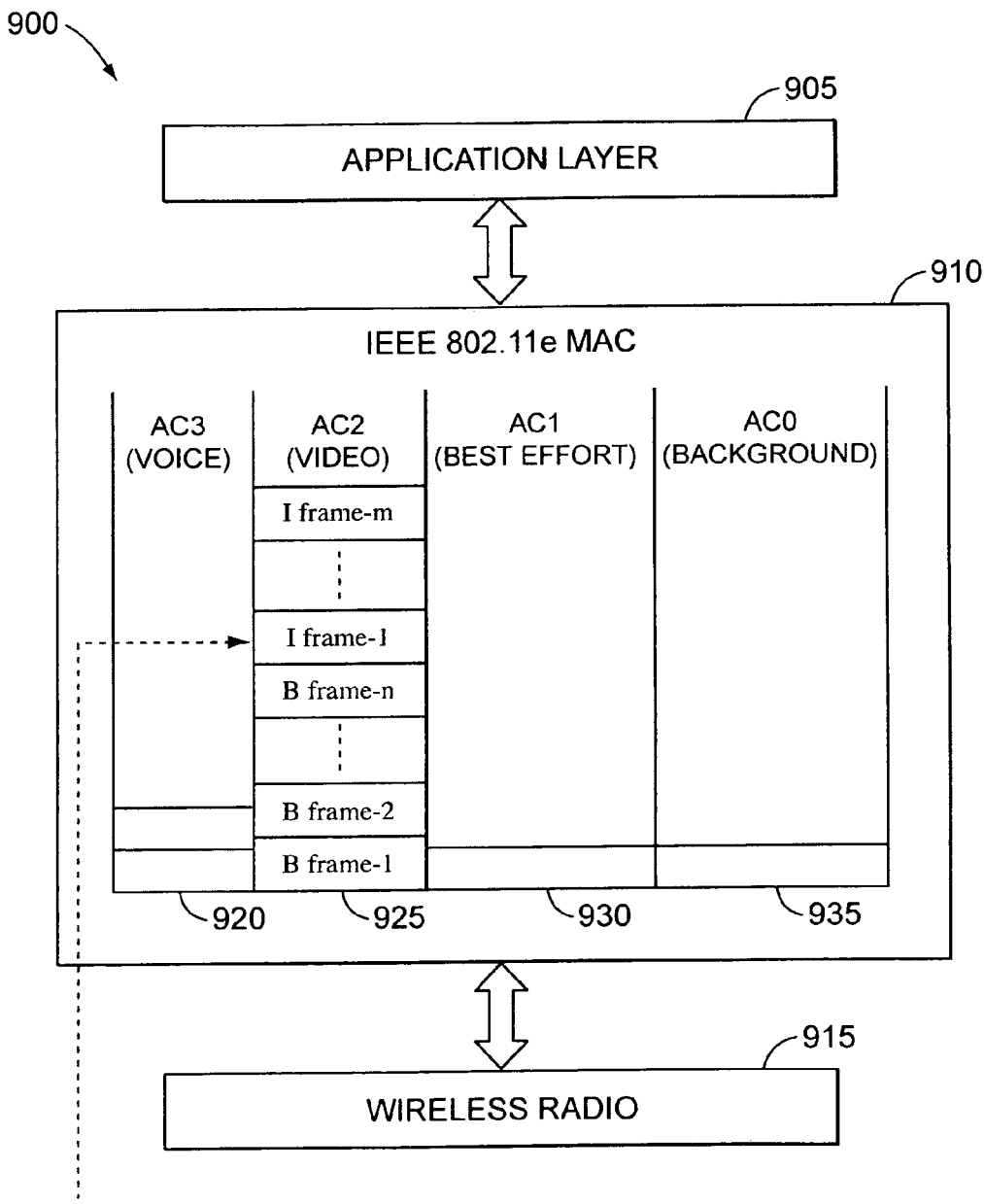
FIG. 9 is a block diagram illustrating layers in a video WLAN system server incorporating video-frame-based discrimination with priority inheritance, in accordance with an embodiment of the present invention.

FIG. 9 is a block diagram illustrating layers 900 in a video WLAN system server 215 incorporating video-frame-based discrimination with priority inheritance, in accordance with an embodiment of the present invention. Layers 900 include an application layer 905, a discriminatory MAC layer 910, and a physical layer 915. The application layer 905 is similar to application layer 405. The physical layer 915 is similar to the physical layer 415. Like the discriminatory MAC layer 410, the discriminatory MAC layer 910 includes four transmission queues, namely, a voice queue 920, a video queue 925, a best effort queue 930, and a background queue 935. Incoming transmission frames are forwarded to the queues in a similar manner as described in FIG. 4.

However, the discriminatory MAC/Access Controller Software 220 sets EDCA parameter values in a manner different than that shown in and described with reference to FIG. 4. As shown in FIG. 9, B frame fragment-1 to B frame fragment-n precede I frame fragments. Assuming that B frames use lower priority EDCA parameter values than I frames, then the I frame fragments may be indirectly prejudiced, having to wait a longer time until the B frame fragments are all sent, especially if there are several B frame fragments, e.g., during a fast action scene. Accordingly, the discriminatory MAC/Access Controller Software 220 may prioritize B frame fragments when they number more than a threshold, e.g., more than can be sent in a single TXOP.

FIG. 10 is a table illustrating a second EDCA parameter set 1000, in this case for a video WLAN system server 215 incorporating video-frame-based discrimination with priority inheritance, in accordance with an embodiment of the present invention. As shown in FIG. 10, B frame fragments that number more than a threshold T are given EDCA parameter values of higher priority than the default, including in this embodiment of higher priority than I/P frames. I/P frames will indirectly benefit. Other EDCA parameter schemes are also possible, e.g., I/P frame fragments may user higher priority EDCA parameter values, B frame fragments numbering less than T may use lower priority EDCA parameter values (e.g., default), and B frame fragments numbering more than T may use higher priority EDCA parameter values (possibly the same higher priority EDCA parameter values as I/P frame fragments, although not necessarily). As shown specifically, EDCA parameter values need not be integers, since probabilistic mechanisms can be used to effect non-integer timer values.

Figures 1, 11:
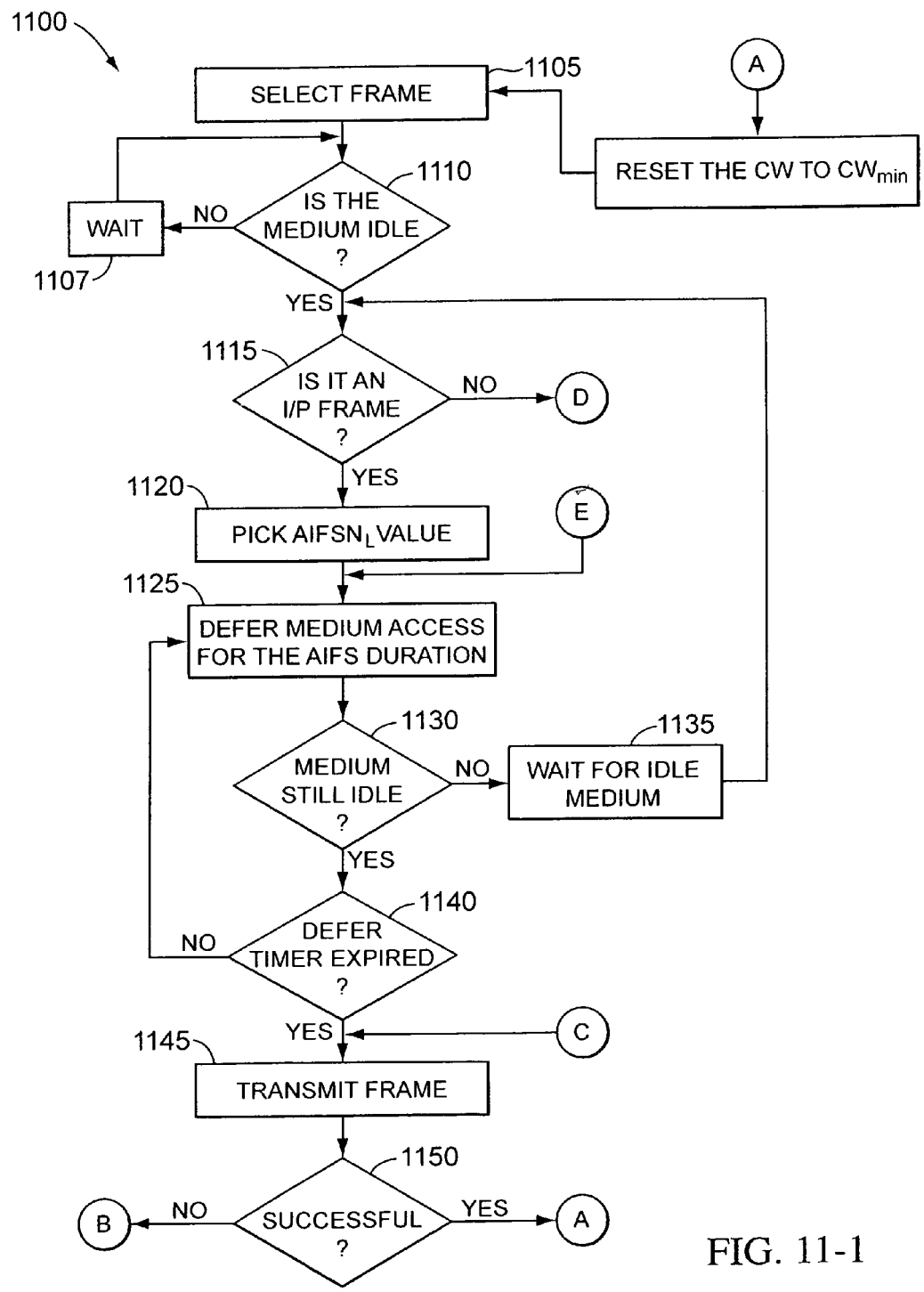
FIG. 1 is a table illustrating default EDCA parameters in accordance with the prior art.
FIG. 11 is a flowchart illustrating a method of transmitting transmission frames in an IEEE 802.11e network incorporating dual video-frame-based discrimination, in accordance with an embodiment of the present invention.
Figures 2, 11:
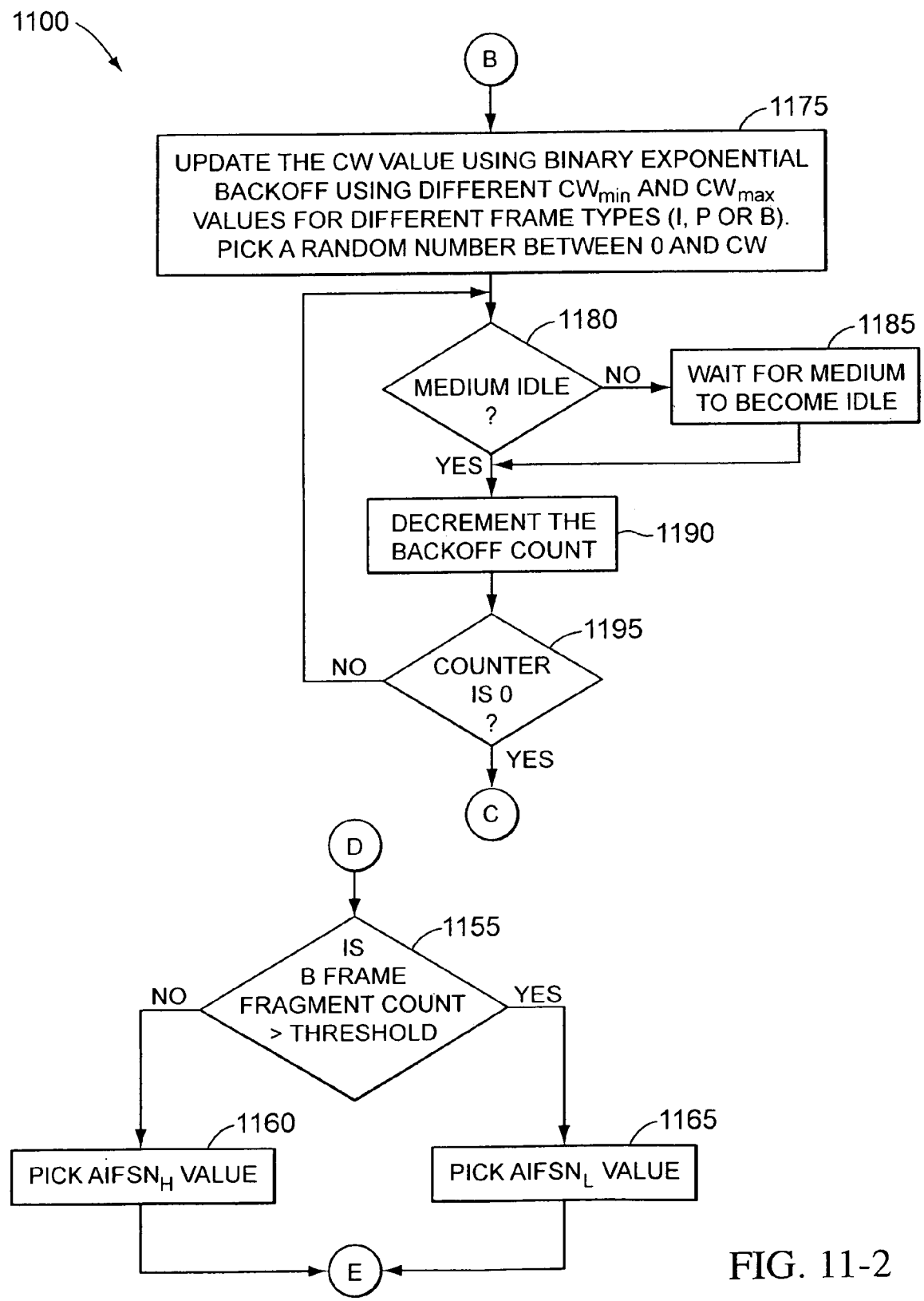

FIG. 11 is a flowchart illustrating a method 1100 of transmitting transmission frames in an IEEE 802.11e framework incorporating dual video-frame-based discrimination including priority inheritance, in accordance with an embodiment of the present invention. One example structure for performing method 1100 is the discriminatory MAC/Access Controller Software 220 in the MAC layer 410. Method 1100 begins with the discriminatory MAC/Access Controller Software 220 in step 1105 selecting a transmission frame for transmission. The discriminatory MAC/Access Controller Software 220 in step 1110 determines if the medium is idle. If not idle, then the discriminatory MAC/Access Controller Software 220 in step 1107 waits. Once the medium becomes idle, the discriminatory MAC/Access Controller Software 220 in step 1110 determines whether the video transmission frame includes an I/P frame fragment. If the transmission frame includes an I/P frame fragment, then the discriminatory MAC/Access Controller Software 220 in step 1120 sets the EDCA parameters to values of higher priority than for B frames, possibly by using $AIFSN_L$ and in step 1125 defers for the AIFS duration. If the discriminatory MAC/Access Controller Software 220 in step 1130 determines that that medium is idle and in step 1140 that the timer has expired, then the discriminatory MAC/Access Controller Software 220 in step 1145 transmits the video transmission frame. If in step 1135 the medium is not idle, then the discriminatory MAC/Access Controller Software 220 in step 1135 returns to 1115 to reset the AIFS counter and wait the AIFS duration. If in step 1140 the timer has not expired (and the medium is still idle), then the discriminatory MAC/Access Controller Software 220 returns to step 1125 to continue waiting the AIFS duration. If the transmission in step 1145 is successful, then the discriminatory MAC/Access Controller Software 220 in step 1170 resets CW to CWmin and returns to step 1105 to select another video transmission frame for transmission.

If the transmission in step 1145 is unsuccessful, then the discriminatory MAC/Access Controller Software 220 in step 1175 updates the CW value using a binary exponential backoff using CWmin and CWmax values, which in one embodiment may be based on video frame types, and picks a random value between 0 and CW. The discriminatory MAC/Access Controller Software 220 in step 1180 determines if the medium is idle. If not still idle, then the discriminatory MAC/Access Controller Software 220 in step 1185 waits for the medium to resume being idle (for an AIFS duration). When idle, the discriminatory MAC/Access Controller Software 220 in step 1190 decrements the backoff counter. The discriminatory MAC/Access Controller Software 220 in step 1195 determines if the backoff counter has reached zero. If not, then the discriminatory MAC/Access Controller Software 220 returns to step 1180 to determine if the medium is still idle and to continue decrementing the backoff counter when idle. When the counter reaches zero, then the method 1100 returns to step 1145 to transmit the video transmission frame.

If in step 1110 the discriminatory MAC/Access Controller Software 220 determines that the video transmission frame does not include an I/P frame fragment, then the discriminatory MAC/Access Controller Software 220 in step 1155 determines if the video transmission frame includes a B frame fragment and if the number of B frame fragments in the set for the particular B frame count more than a threshold number. If the B frame fragment count is greater than the threshold number, then the discriminatory MAC/Access Controller Software 220 in step 1165 uses higher priority parameter values, e.g., the $AIFSN_L$ value. If not, then the discriminatory MAC/Access Controller Software 220 in step 1160 uses the lower priority parameter values, e.g., the $AIFSN_H$ value. All lower priority video transmission frames, e.g., B frame fragments lower than the threshold number, video transmission frames containing uncompressed video frame fragments, etc., may use the lower priority parameter values.

Although not shown in this method 1100, the discriminatory MAC/Access Controller Software 220 may set the EDCA parameters for non-video frames (e.g., voice, best effort, and background frames) using default EDCA parameter values. Although not discussed in this flowchart, the method 1100 may include TXOP duration discrimination, whether based on video frame type and/or based on a transition from one frame type to another.

Further, although the systems and methods herein are being described relative to MPEG video frames, systems and methods can be developed for any hierarchically divided frame encryption protocol, whether for multimedia, video, voice or other content. In one embodiment, any content belonging to a single access class (and thus having a primary priority level for contention and/or retention—possibly a default priority level) may also have a secondary priority level within the access class based on the priority of the content within the hierarchical divisions of the encryption protocol (and thus having an adjusted priority level for contention and/or retention—possibly an increased or a decreased priority level relative to the default).

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A method, comprising:
receiving by a MAC layer of a content server a transmission frame from an upper layer of the content server, the transmission frame being associated with a given access class of multiple access classes, the given access class being associated with a primary priority level, the transmission frame including content being associated with a secondary priority level;

setting MAC layer parameter values based on the primary priority level, a given one of the MAC layer parameter values being based on the primary and secondary priority levels; and contending for access to a wireless medium using the MAC layer parameter values;

wherein the given one of the MAC layer parameter values is one of a first parameter value relating to arbitration interframe space, a second parameter value relating to a maximum value of a contention window, a third parameter value relating to a minimum value of the contention window, and a fourth parameter value relating to a transmission opportunity;

wherein the transmission frame from the upper layer includes a video AC frame having one of an intra-coded frame (I frame) fragment, a prediction coded frame (P frame) fragment, and a bi-directional frame (B frame) fragment; and wherein the MAC layer transfers the transmission frame to the wireless medium with higher priority if the transmission frame includes the I frame fragment or the P frame fragment than if the transmission frame includes the B frame fragment.

2. The method of claim 1, wherein the MAC layer arbitrates the transmission of the I, P and B frame fragments using one or more categories of the MAC layer parameter values; and wherein the categories of the MAC layer parameter values include a first parameter value relating to arbitration interframe space, a second parameter value relating to a maximum value of a contention window, a third parameter value relating to a minimum value of the contention window, and a fourth parameter value relating to a transmission opportunity.

3. The method of claim 1, further comprising:

determining whether the transmission frame includes an intra-coded frame (I frame) fragment, a prediction coded frame (P frame) fragment, or a bi-directional frame (B frame) fragment;

if the transmission frame is determined to include the I frame fragment or the P frame fragment, then setting the given one of the MAC layer parameter values as a higher access priority value; and if the transmission frame is determined to include the B frame fragment, then setting the given one of the MAC layer parameter values as a lower access priority value that is lower than said higher access priority value.

4. The method of claim 1, further comprising generating the transmission frame by a hierarchically divided encryption protocol being resident in at least one of the upper layers of the content server.

5. The method of claim 4, wherein the hierarchically divided encryption protocol includes MPEG.

6. The method of claim 5, wherein the given one of the MAC layer parameter values is different based on whether the content includes an intra-coded frame (I frame) fragment or a bi-directional frame (B frame) fragment.

7. The method of claim 6, wherein the given one of the MAC layer parameter values is the same whether the content includes an I frame fragment or a prediction coded frame (P frame) fragment.

8. The method of claim 1, further comprising counting a number of transmission frames containing video AC frame fragments of a particular video frame and pending in a transmission queue, and wherein the given one of the MAC layer parameter values is also based on the number of transmission frames.

9. The method of claim 1, further comprising receiving a subsequent transmission frame; and sending the transmission frame and the subsequent transmission frame during a single TXOP only if the subsequent transmission frame does not include a fragment of a lower priority video frame.

10. The method of claim 1, further comprising:

determining whether the transmission frame includes an intra-coded frame (I frame) fragment, a prediction coded frame (P frame) fragment, or a bi-directional frame (B frame) fragment;

if the transmission frame is determined to include the I frame fragment or the P frame fragment, then setting the given one of the MAC layer parameter values as a higher access priority value;

counting a number of B frame fragments waiting to be transmitted;

if the transmission frame is determined to include the B frame fragment and the number of the B frame fragments waiting to be transmitted is greater than a threshold, then setting the given one of the MAC layer parameter values as a higher access priority value; and if the transmission frame is determined to include the B frame fragment and the number of the B frame fragments waiting to be transmitted is not greater than the threshold, then setting the given one of the MAC layer parameter values as a lower access priority value that is lower than the higher access priority value.

11. A system, comprising a MAC layer, the MAC layer including:

a first queue for storing first transmission frames of a first primary priority level, the first transmission frames including content being associated with a secondary priority level;

a second queue for storing second transmission frames of a second primary priority level;

memory for storing first MAC layer parameter values based on the first primary priority level and second MAC layer parameter values based on the second primary priority level, a given one of the first MAC layer parameter values being based on the first primary priority level and on the secondary priority level; and a controller module coupled to the first and second queues and to the memory for contending for access to a wireless medium using the first and second MAC layer parameter values;

wherein the given one of the first MAC layer parameter values is one of a first parameter value relating to arbitration interframe space, a second parameter value relating to a maximum value of a contention window, a third parameter value relating to a minimum value of the contention window, and a fourth parameter value relating to a transmission opportunity;

wherein a particular first transmission frame arrives from an upper layer of a content server;

wherein the particular first transmission frame is a video AC frame having one of an intra-coded frame (I frame) fragment, a prediction coded frame (P frame) fragment, and a bi-directional frame (B frame) fragment; and wherein the MAC layer transfers the particular first transmission frame to the wireless medium with higher priority if the particular first transmission frame has the I frame fragment or the P frame fragment than if the particular first transmission frame has the B frame fragment.

12. The system of claim 11,
wherein the MAC layer arbitrates the transmission of the I, P and B frame fragments using one or more categories of the MAC layer parameter values; and
wherein the categories of the first MAC layer parameter values include a first parameter value relating to arbitration interframe space, a second parameter value relating to a maximum value of a contention window, a third parameter value relating to a minimum value of the contention window, and a fourth parameter value relating to a transmission opportunity.

13. The system of claim 11, further comprising a hierarchically divided encryption module resident in at least one of the upper layers of the content server for generating at least a portion of the first transmission frames.

14. The system of claim 13, wherein the hierarchically divided encryption protocol includes an MPEG engine.

15. The system of claim 14, wherein
the first transmission frames of the first primary priority level include video AC frames,
the second transmission frames of the second primary priority level includes one of voice AC frames, best effort AC frames and background AC frames,
the content being associated with the secondary priority level includes one of a prediction coded frame (P frame) fragment, an intra-coded frame (I frame) fragment, and a bi-directional frame (B frame) fragment, and
the given one of the MAC layer parameter values is different based on whether the content includes an I frame fragment or a B frame fragment.

16. A system, comprising:
first MAC layer means for receiving a transmission frame from an upper layer of a content server, the transmission frame associated with a given access class of multiple access classes, the given access class being associated with a primary priority level, the transmission frame including content being associated with a secondary priority level;
second MAC layer means for setting MAC layer parameter values based on the primary priority level, a given one of the MAC layer parameter values being based on the primary and secondary priority levels;
third MAC layer means for contending for access to a wireless medium using the MAC layer parameter values;
wherein the given one of the MAC layer parameter values is one of a first parameter value relating to arbitration interframe space, a second parameter value relating to a maximum value of a contention window, a third parameter value relating to a minimum value of the contention window, and a fourth parameter value relating to a transmission opportunity;
wherein the transmission frame from the upper layer includes a video AC frame having one of an intra-coded frame (I frame) fragment, a prediction coded frame (P frame) fragment, and a bi-directional frame (B frame) fragment; and
fourth MAC layer means for transferring the transmission frame to the wireless medium with higher priority if the transmission frame includes the I frame fragment or the P frame fragment than if the transmission frame includes the B frame fragment.

17. The system of claim 16, further comprising:
fifth MAC layer means for arbitrating the transmission of the I, P and B frame fragments using one or more categories of the MAC layer parameter values; and
wherein the categories of the first MAC layer parameter values include a first parameter value relating to arbitration interframe space, a second parameter value relating to a maximum value of a contention window, a third parameter value relating to a minimum value of the contention window, and a fourth parameter value relating to a transmission opportunity.

18. The system of claim 16, further comprising a hierarchically divided encryption module resident in at least one of the upper layers of the content server for generating at least a portion of the first transmission frames.

19. The system of claim 18, wherein the hierarchically divided encryption protocol includes an MPEG engine.

20. The system of claim 19,
wherein the given one of the MAC layer parameter values is different based on whether the content includes an I frame fragment or a B frame fragment; and
wherein the given one of the MAC layer parameter values is the same whether the content includes an I frame fragment or a P frame fragment.

* * * * *